US006807190B1

(12) United States Patent
Kremer

(10) Patent No.: US 6,807,190 B1
(45) Date of Patent: Oct. 19, 2004

(54) SURVIVABLE DISTRIBUTION OF BROADCAST SIGNALS IN LOOPBACK RINGS

(75) Inventor: Wilhelm Kremer, Adover, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/318,385

(22) Filed: May 25, 1999

(51) Int. Cl.[7] .............................................. H04L 12/403
(52) U.S. Cl. ....................... 370/452; 370/223; 370/224
(58) Field of Search ................................. 370/216, 217, 370/221, 223, 225, 224, 228, 402, 403, 405, 542, 395, 396; 714/4, 716, 717

(56) References Cited

U.S. PATENT DOCUMENTS

| | | | | |
|---|---|---|---|---|
| 5,003,531 A | * | 3/1991 | Farinholt | 370/223 |
| 5,278,824 A | * | 1/1994 | Kremer | 370/223 |
| 5,390,164 A | * | 2/1995 | Kremer | 370/223 |
| 5,394,389 A | * | 2/1995 | Kremer | 370/223 |
| 5,406,401 A | * | 4/1995 | Kremer | 370/405 |
| 5,440,540 A | * | 8/1995 | Kremer | 370/227 |
| 5,442,620 A | * | 8/1995 | Kremer | 370/224 |
| 5,684,799 A | * | 11/1997 | Bigham | 370/397 |
| 5,815,490 A | * | 9/1998 | Lu | 370/223 |
| 6,122,250 A | * | 9/2000 | Taniguchi | 370/221 |
| 6,195,704 B1 | * | 2/2001 | Suita | 709/239 |
| 6,256,292 B1 | * | 7/2001 | Ellis | 370/227 |
| RE37,401 E | * | 10/2001 | Yamashita et al. | 714/717 |
| 6,456,587 B2 | * | 9/2002 | Taniguchi | 370/216 |

* cited by examiner

*Primary Examiner*—Douglas Olms
*Assistant Examiner*—Ricardo M. Pizarro

(57) ABSTRACT

A node for use in a multi-source ring transmission system includes a controller and storage. Identifiers, such as ring addresses, for the relative first and relative last source nodes within the ring transmissions system are stored within the node's storage, in a squelch table for example. The node's relative first source node is the source node farthest upstream from the node and the node's relative last source node is the node that is farthest downstream from the node. The node blocks communications whenever both its relative first source node and its relative last source node fail.

24 Claims, 9 Drawing Sheets

SURVIVABLE DISTRIBUTION OF BROADCAST SIGNALS IN LOOPBACK RINGS

FIELD OF THE INVENTION

The invention relates to the distribution of signals and, more particularly, to the survivable broadcast distribution of signals.

BACKGROUND OF THE INVENTION

A variety of signal distribution applications may require the broadcast distribution of signals. For example, television, motion picture, radio, or other communications signals that are typically broadcast via the airwaves may also be distributed through a telecommunications network. To avoid major service disruptions, a telecommunications system that broadcasts signals should provide for some form of network survivability, to accommodate the failure of an element or link within the network. A telecommunications system having a loopback ring architecture, that is, a system in which signals traveling in one direction around a ring are rerouted in the opposite direction for delivery in the event of a failure, may provide some degree of survivability. However, such a self-healing system could inadvertently distribute signals to locations that are not supposed to receive those signals. In some cases, such rogue signals could be squelched to prevent their improper distribution. Such squelching is discussed, for example, in U.S. Pat. No. 5,442,620 which issued to the same inventor and is assigned to the same assignee as the present invention and which is hereby incorporated by reference. Although the squelching employed by such a system operates well under some circumstances, it may prove inadequate in a system that includes a plurality of signal sources.

Although conventional squelching approaches may be inadequate for multi-sourced, broadcast systems, neither is the forsaking of squelching a solution. Without squelching in such a network, an "infinite loop" may be established in the ring transmission system, whereby network equipment could constantly alter pointer values or vacillate between an indication of the presence or loss of a pointer. Additionally, in order to be compatible with existing systems, which employ squelch tables it would be advantageous for a new communications system to employ a compatible squelching mechanism.

There is, therefore, a need for a broadcast distribution telecommunications system that provides survivability, prevents the improper distribution of signals, and circumvents the creation of infinite loops in the event of a plurality of source failures.

SUMMARY

In accordance with the principles of the present invention, a network communications node for use in a broadcast ring communications system includes a controller that is responsive to indications that a relative first source node, that is, the source node farthest upstream, and a relative last source node, that is, the source node farthest downstream, in the communications system have failed by blocking communications through the node. In an illustrative embodiment identifiers of the relative first source node and relative last source node are stored within the network communications node in the form of entries in a squelch table. However, unlike conventional squelch table entries, which indicate the first entry point and last exit point in a circuit, the squelch table entries within the new communications node identify the relative first source node and last source node. The node blocks communications signals through itself only when both its relative first and relative last source nodes have failed.

The new node is particularly suited for a broadcast line-switched ring communications system that includes a plurality of sources. In accordance with the principles of the invention, each source within such a system would have associated with it a node, referred to as a source node, that is configured to operate as a drop-and-continue node. Each source within such a system accepts signals from a source and broadcasts the signals to drop-and-continue nodes in a given direction around the ring. Additionally, each source node accepts signals from another source node through a connection to a drop and continue node, with the signal routed around the ring from one source node to another in the same direction, that is, clockwise or counterclockwise. Each node within the ring has a relative first source node and a relative last source node associated with it. A node's relative first source node is the source node farthest upstream from the node and the node's relative last source node is the source node farthest downstream from the node. In a ring communications system in accordance with the principles of the present invention the node adjacent a failed node is a switching node. That is, the node performs a loopback switch in order to preserve as much of the ring as possible. However, if a switching node detects the failure of both its relative first source node and its last source node, the node blocks communications, rather than performing the ring loopback.

The new node, and bidirectional line-switched ring communications systems that may employ such a node, are particularly suited for use in the distribution of high-bandwidth signals, such as television, near video on demand, and other such communications. For example, a broadcast television distribution system could employ two of the new nodes as source nodes, each of which receives television signals for broadcast from a television headend. One or more of the new nodes may be positioned in a branch of the ring between the first and second source nodes, with the television signals being transmitted from the first headend through the first node, which is configured as a drop-and-continue node. From the first node, the television signals are sent, in a given direction, to the node(s) lying between the two source nodes. Each of the nodes lying between the source nodes acts as a drop-and-continue node, distributing the television signals locally, and passing them along to the next node in the loop. At the opposite end of the branch, another node, the other source node, accepts the television signals that have made their way through intervening drop-and-continue node(s). This source node may drop, or distribute, the received television signals locally. Additionally, this source node at the opposite end of the branch accepts television signals from a second television headend and distributes the signals in the same direction, (i.e., clockwise or counterclockwise) to additional node(s) in a second branch. The node(s) in the second branch operate in the same manner as those in the first branch, (i.e., drop-and-continue) and the signal from the second source node makes its way to the first source node. Should a node fail, the adjacent upstream node, referred to as the switching node, performs a loopback so that television signals may be distributed on the other side of the failed node. Each operational ring node continues to operate in a drop-and-continue mode unless both source nodes fail, in which case the switching node blocks signal transmissions. This blocking may be effected in a synchronous optical network (SONET) implementation, for example, by sending alarm indication signals (AIS) along the protection the system's protection channel.

A broadcast distribution ring in accordance with the principles of the present invention may include more than two sources. In such a multi-source network each node may operate as a drop-and-continue node with substantially the same loopback operation as just described, except that the switching node looks to its relative first and last source nodes to determine whether to block signal transmissions. The relative first and last source nodes are, respectively, the closest downstream source node and the closest upstream source node. The failure of a node may indicate that the path to the node has failed, or that the performance of the node itself has degraded to an unacceptable level. Such a failure could be detected by the expiration of a timer or by the failure of a "Hello" signal or other conventional failure detection techniques. The multi-sourced broadcast ring architecture just described provides survivable service through it's redundant sources. That is, if one source fails, one or more surviving sources may be used, via loopbacks, to supply signals to the node(s) which had previously obtained signals from the failed source, and, the nodes block transmissions to prevent the unwanted delivery of signals. Furthermore, the architecture could be used to supply varying levels of service to the nodes within the network. For example, one or more sources may supply a more expansive list of offerings than the other sources. In that case, the survivability for the premium source's offerings may be limited to a subset offered by a source which provides redundancy for the premium source.

Each node within such a system includes a ring map, which depicts the interconnection of nodes within the ring. The ring map also includes a squelch table that contains the addresses of the relative first source node (the "A" address) and relative last source node (the "Z" address) for each circuit that is inserted, passes through, or is dropped at the node. Each switching node looks up the A and Z addresses and squelches all circuits (e.g., inserts AIS in the circuits' time-slots) that pass through the node, should the A and Z nodes fail.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

In accordance with the principles of the present invention, a network communications node for use in a broadcast ring communications system blocks communications whenever it is adjacent to a node that fails and its relative first source node and relative last source node fail. Otherwise, in the event the node is a switching node, i.e., it is adjacent to a failed node, the node performs a loopback switch that enables as many surviving nodes in the network as possible to continue receiving communications signals for broadcast distribution. The new node may be employed, for example, in a bidirectional line switched ring communications system having two or more source nodes. Such a communications system may be employed, for example, to broadcast television signals from a plurality of television headends.

Figure 1:
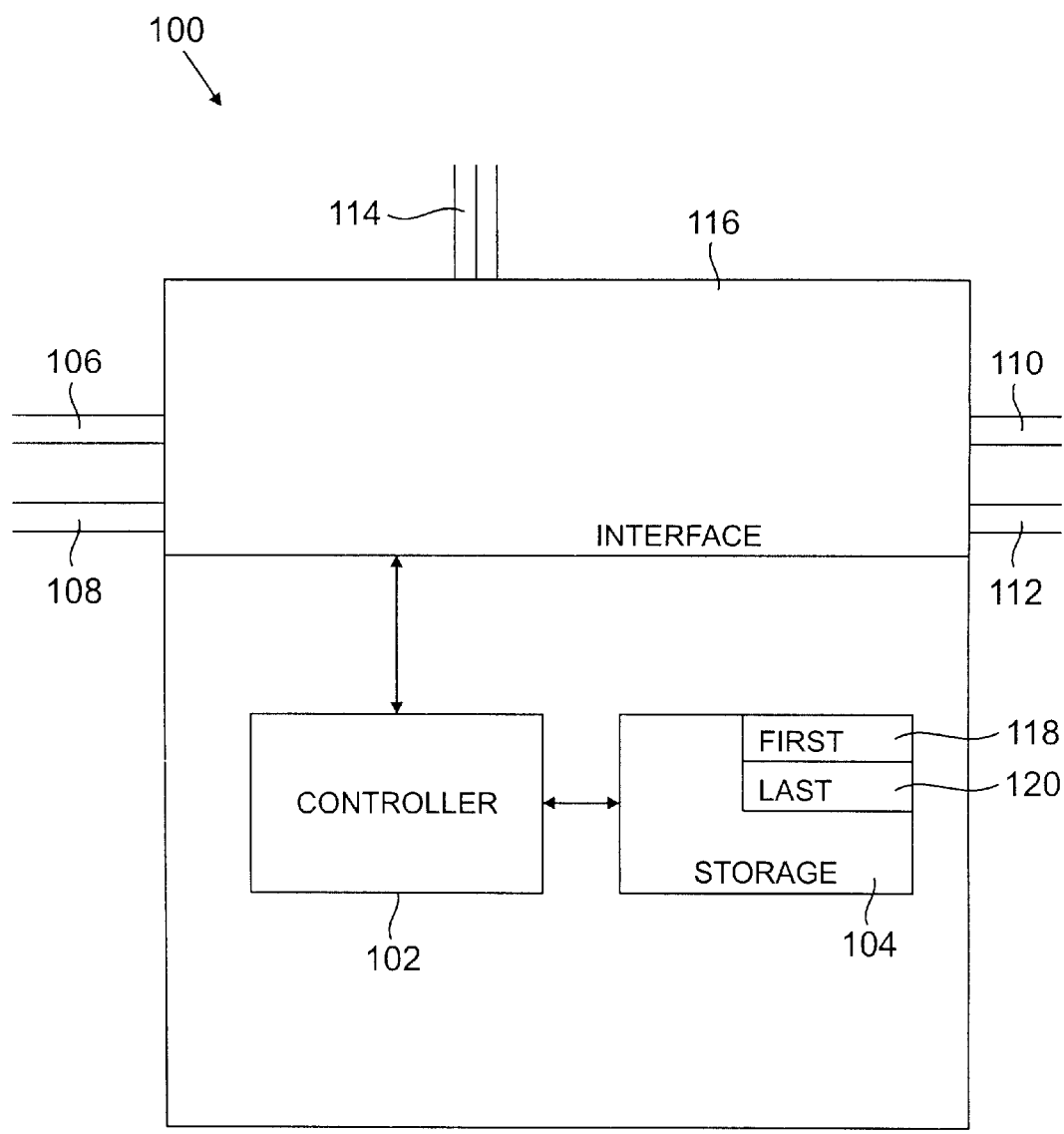
FIG. 1 is a conceptual block diagram of a ring node in accordance with the principles of the invention.

The conceptual block diagram of FIG. 1 illustrates some of the functional blocks included in a communications node 100 in accordance with the principles of the present invention. In its physical implementation the node may take the form of an add-drop-multiplexer (ADM), for example. The new node 100 includes a controller 102 which and storage 104. The controller 102 may be implemented using a commercially available microprocessor, a custom integrated circuit, an application specific integrated circuit, or a bit-slice processor, for example. The storage 104 may take the form of nonvolatile memory such as a disk, battery-backed random access memory (RAM), or electrically erasable programmable read only memory (EEPROM). Alternatively the storage 104 could be implemented using volatile storage devices such as RAM. The node 100 also includes transmission paths 106, 108, 110, 112, and 114, and an interface 116 which effects various interconnections of the transmission paths. For example, path 106 may be directly connected through the interface 116 to the path 110, or it may be connected in a loopback to path 108. Additional connection configurations are known and each of the paths 106, 108, 110, and 112 may entail the use of a separate physical transmission medium, such as an optical fiber, or a physical transmission medium may be shared by a plurality of communications paths. The communications path 114 may be a drop, an add, or a combination drop and add communications path and could be employed, as will be described in greater detail below, to receive broadcast transmission signals, to "drop" broadcast transmission signals, or both.

The controller 102 monitors communications activity on the paths 106 through 114, through the interface 116, controls the configuration of the communications paths, and determines whether signals should be blocked in the case of a node failure. Unlike conventional nodes possessing squelch tables that include the first entry and last exit nodes for a circuit, the node's relative first source identifier 118 and relative last source identifier 120 are stored within a squelch table within the storage 104. The controller monitors the interface 116 and, in the event both nodes associated with the identifiers 118 and 120 fail, the controller blocks communications through the node, for example, by transmitting alarm indication signals (AIS) along one or more of the paths 106 through 112.

The new node 100 is particularly suited for a broadcast line-switched ring communications system that includes a plurality of sources. In such a system each source may have associated with it a node, referred to as a source node, that is configured to operate as a drop-and-continue node. Each source node accepts signals from a source and broadcasts the signals to drop-and-continue nodes in a given direction around the ring. Additionally, each source node accepts signals from another source node through a connection to a drop and continue node, with the signal routed around the ring from one source node to another in the same direction, that is, clockwise or counterclockwise. Each node within the ring has a relative first source node and a relative last source node associated with it. A node's relative first source node is the source node farthest upstream from the node and the node's relative last source node is the source node farthest downstream from the node. In a ring communications system in accordance with the principles of the present invention the upstream node adjacent a failed node is a switching node. That is, in the event of the adjacent node's failure, the node performs a loopback switch in order to preserve the distribution of signals to as much of the ring as possible. However, if a switching node detects the failure of both its relative first source node and its last source node, the switching node blocks communications.

Figure 2:
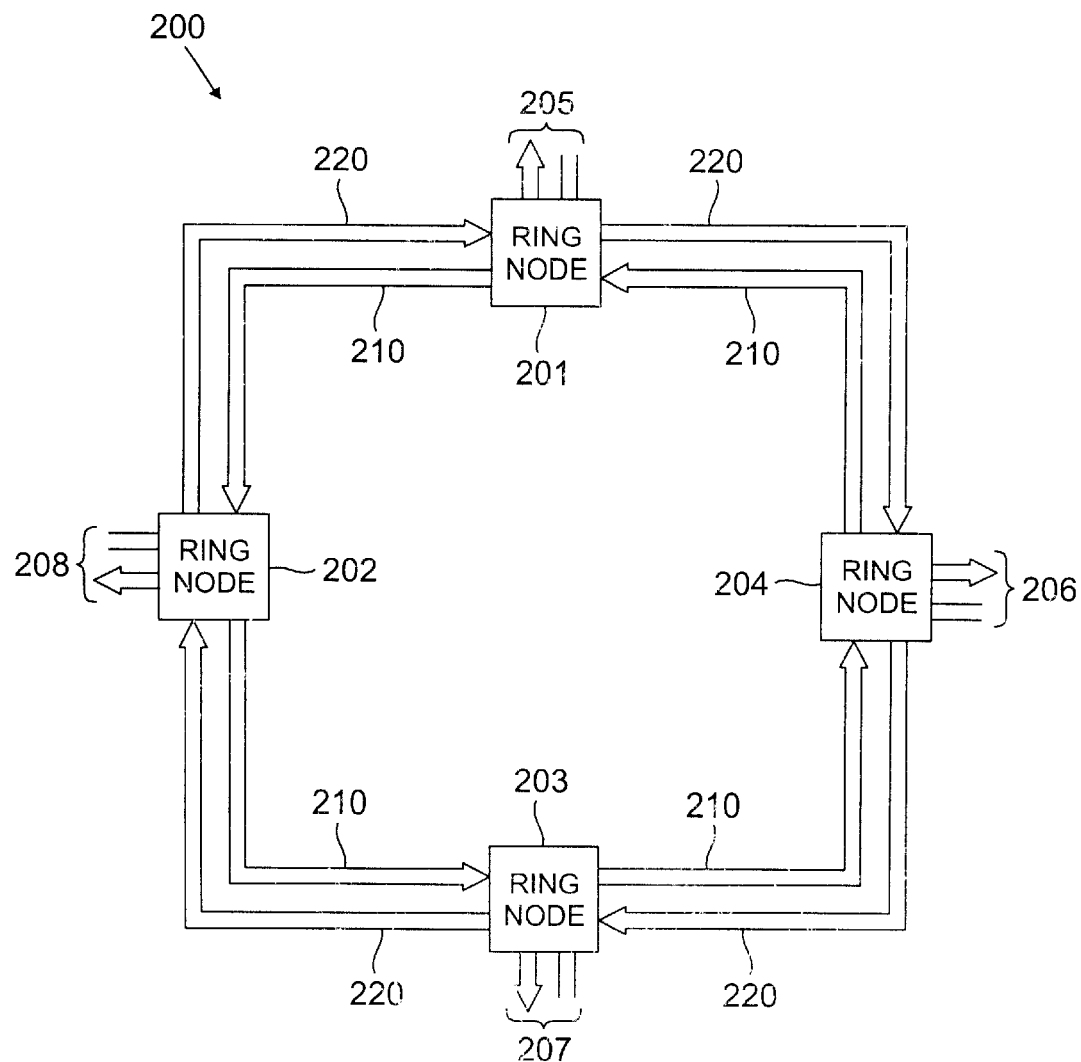
FIG. 2 is a conceptual block diagram of a broadcast ring transmission system in accordance with the principles of the present invention.

The conceptual block diagram of FIG. 2 illustrates a multi-source broadcast bidirectional line switched ring communications system in accordance with the principles of the invention. In this illustrative embodiment, the bidirectional line-switched ring transmission system 200 is depicted in simplified form. The ring transmission system 200, for brevity and clarity of exposition, is shown as including only ring nodes 201 through 204, each incorporating an illustrative example of the invention. Ring nodes 201 through 204 are interconnected by transmission path 210 in a counter-clockwise direction and by transmission path 220 in a clockwise direction. In this example, transmission paths 210 and 220 are comprised of optical fibers and each could be comprised of a single optical fiber or two (2) optical fibers. That is, bidirectional line-switched ring transmission system 200 could be either a two (2) optical fiber or a four (4) optical fiber system. In a two (2) optical fiber system, each of the fibers in transmission paths 210 and 220 includes service bandwidth and protection bandwidth. In a four (4) optical fiber system, each of transmission paths 210 and 220 includes an optical fiber for service bandwidth and a separate optical fiber for protection bandwidth. Such bidirectional line-switched ring transmission systems are known. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 210 and 220. The SONET digital signal formats are described in a Technical Advisory entitled "Synchronous Optical Network (SONET) Transport Systems: Common Generic Criteria", TA-NWT-000253, Bell Communications Research, Issue 6, September 1990. Each of the nodes 201 through 204 includes a transmission path, 205 through c208 respectively, that may be employed to "drop" or "add" signals. As will be discussed in greater detail below, in an illustrative broadcast television embodiment the transmission paths 205 through 208 would be employed as drop paths. Additionally, the paths 206 and 208 would be employed both as add paths whereby the respective nodes 204 and 202 would add television transmission signals from television "headends".

It is noted that requests and acknowledgements for protection switch action are transmitted in an automatic protection switch ("APS") channel in the SONET overhead accompanying the protection bandwidth on each of transmission paths 210 and 220. The APS channel, in the SONET format, comprises the K1 and K2 bytes in the SONET overhead of the protection bandwidth. The K1 byte indicates a request of a communications circuit for switch action. The first four (4) bits of the K1 byte indicate the switch request priority and the last four (4) bits indicate the ring node identification (ID). The K2 byte indicates an acknowledgment of the requested protection switch action. The first four (4) bits of the K2 byte indicate the ring node ID and the last 4 bits indicate the action taken. For purposes of this description, a "communications circuit" is considered to be a SONET STS-3 digital signal having its entry and exit points on the ring.

Each of ring nodes 201 through 204 comprises and add-drop multiplexer ("ADM"). Such add-drop multiplexer arrangements are known. For generic requirements of a SONET based ADM see the Technical Research entitled "SONET ADD-DROP Multiplex Equipment (SONET ADM) GENERIC CRITERIA", TR-TSY-000496, Issue 2, September 1989, Supplement 1, September 1991, Bell Communications research. In this example, the ADM operates in a transmission sense to pass signals through the ring node, to add signals at the ring node, to drop signals at the ring node, to bridge signals during a protection switch and to loop-back-switch signals during a protection switch at the ring node.

Each of the nodes 201 through 204 includes storage 104, which, in turn, includes the addresses of the node's relative first source address 118, and the node's relative last source address. For example, assume that ring node 204 is configured to receive broadcast transmission signals and to distribute those signals along a working channel 220 to ring node 203, where the signals are dropped through the transmission path 207. From the ring node 203, the signals continue through the path 220 to node 202, where the signals are dropped through transmission path 208. Assume further that the ring node 202 is configured to receive broadcast transmission signals and to distribute those signals along the working channel 220 to ring node 201, where the signals are dropped through the transmission path 205. From the ring node 201, the signals continue through the path 220 to node 204, where the signals are dropped through transmission path 206. In this case, the ring node 204 is the source node furthest upstream from node 201 and the address of ring node 204 is stored in the relative first source node location within the squelch table of ring node 201. Additionally, since ring node 202 is the source node furthest downstream from node 201, the address of ring node 202 is stored within the relative last source node location within the squelch table of ring node 201. Similarly, the ring node 202 is the source node furthest upstream from node 203 and the address of ring node 202 is stored in the relative first source node location within the squelch table of ring node 203. Additionally, since ring node 204 is the source node furthest downstream from node 203, the address of ring node 204 is stored within the relative last source node location within the squelch table of ring node 203. Should the source nodes 202 and 204 fail, nodes 201 and 203 will block communications in their protection transmission paths 210.

Figure 3:
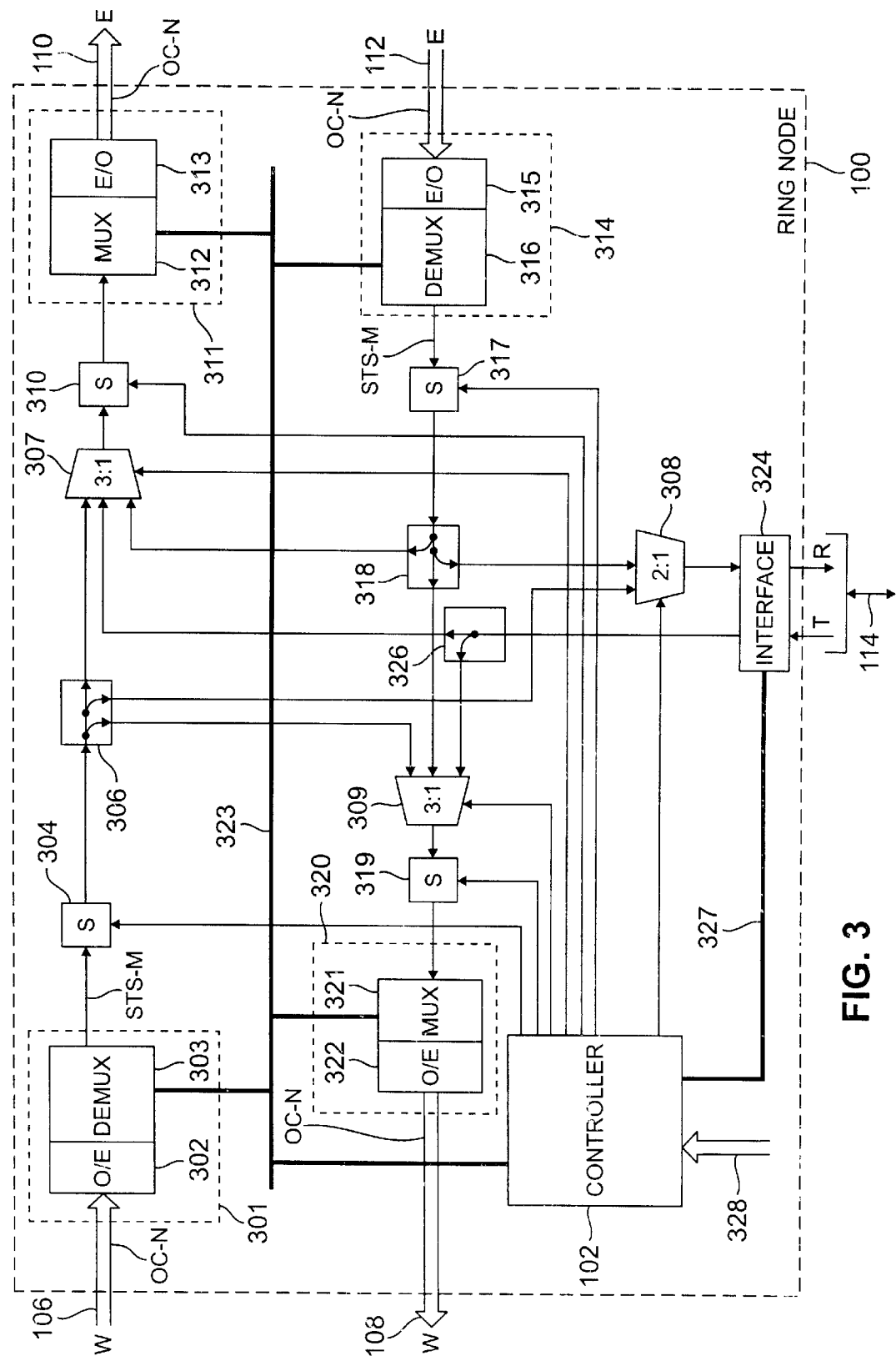
FIG. 3 is a more detailed conceptual block diagram of a ring node in accordance with the principles of the invention.
Figure 4:
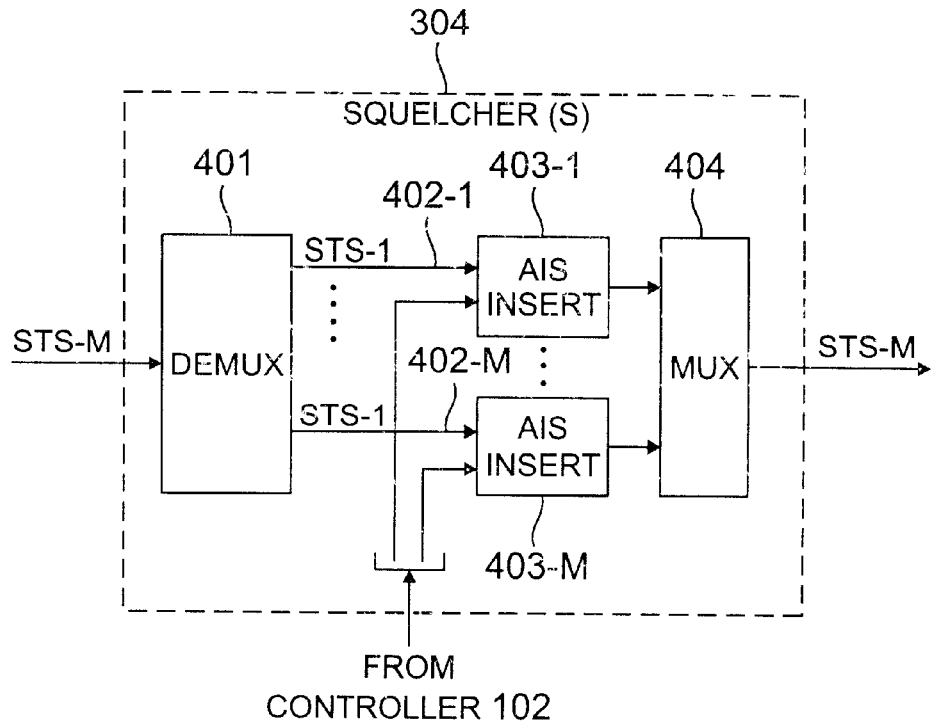
FIG. 4 is a conceptual block diagram of a squelcher that may be employed in the new ring node.
Figure 5:
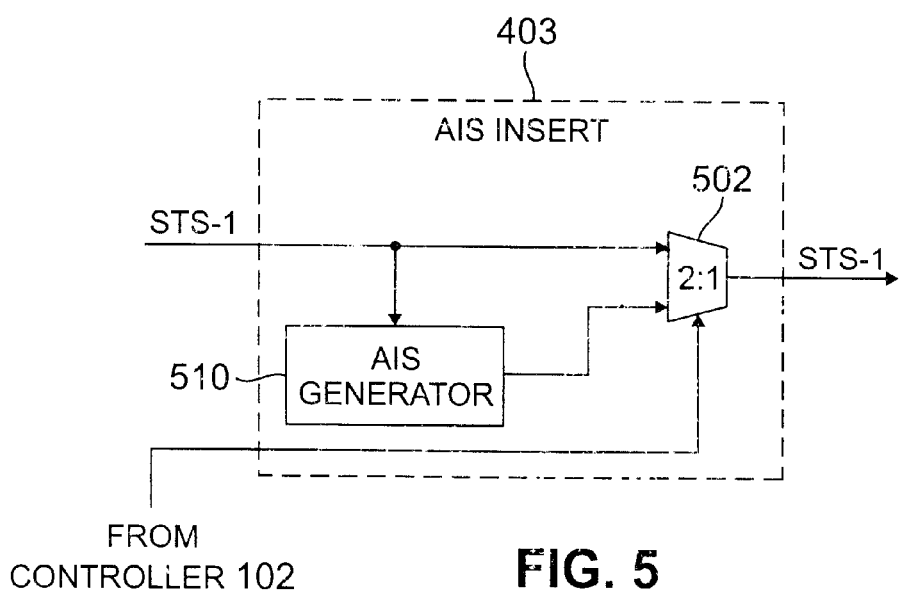
FIG. 5 is a conceptual block diagram of an alarm indication signal insertion device which may be employed by the new ring node.

FIG. 3 shows, in simplified block diagram form, details of a ring node, such as the ring nodes 201 through 204 of FIG. 2, in accordance with the principles of the invention. In this example, a west (W)-to-east(E) digital signal transmission direction is assumed in the service bandwidth and the protection bandwidth on transmission path 210 into the transmission path 106 of the ring node 100. It will be apparent that operation of the ring node and the ADM therein would be similar for an east(E)-to-west(W) digital signal transmission direction in the service bandwidth and the protection bandwidth on transmission path 220. Specifically, shown is transmission path 106 entering the ring node and supplying an OC-N SONET optical signal to receiver 301, where N could be, for example, 12 or 48. Receiver 301 includes an optical/electrical (O/E) interface 302 and a demultiplexer (DEMUX) 303, which yields at least one (1) STS-M SONET digital signal. Such O/E interfaces and demultiplexers are known. In this example, M is assumed to be three (3) and N is greater than M. The STS-M signal output from DEMUX 303 is supplied to squelcher (S) 304 which under control of controller 305 controllably squelches, i.e., blocks, particular incoming communications circuits by inserting an alarm indication signal (AIS), as described below. Detail of squelcher (S) 303 are shown in FIGS. 4 and 5 and its operation is described below. Thereafter, the STS-M signal, squelched or otherwise, is supplied to broadcast element 306. A broadcast element replicates the STS-M signal supplied to it and supplies the replicated signals as a plurality of individual outputs. Such broadcast elements are known. Broadcast element 306 generates three identical STS-M signals and supplies one STS-M signal to an input of 3:1 selector 307, a second STS-M signal to an input of 2:1 selector 308 and a third STS-M signal to an input of 3:1 selector 309. An STS-M signal output from 3:1 selector 307 is supplied to squelcher (S) 310, which is identical to squelcher (S) 304. Squelcher (S) 310 is employed, under control of controller 102, to squelch particular outgoing communications circuits. The STS-M signal output from squelcher (S) 310 is supplied to transmitter 311 and therein, to multiplexer (MUX) 312. The output of MUX 312 is an electrical OC-N digital signal, which is interfaced to transmission path 310 via electrical/optical (E/O) interface 313. Such multiplexers (MUXs) and electrical/optical (E/O) interfaces are well known.

Similarly, in the east (E)-to-west (W) direction an OC-N optical signal is supplied via transmission path 112 to receiver 314 and, therein, to optical/electrical (O/E) interface 315. In turn, demultiplexer (DEMUX) 316 yields a STS-M signal which is supplied via squelcher (S) 317 to broadcast element 318. Broadcast element 318 replicates the STS-M signal into a plurality of identical STS-M signals, in this example, three (3). One STS-M signal is supplied to an input of 3:1 selector 307, a second STS-M signal is supplied to an input of 2:1 selector 308 and a third STS-M signal is supplied to an input of 3:1 selector 209. An output from 3:1 selector 209 is supplied via squelcher (S) 319 to transmitter 320. In transmitter 320, multiplexer (MUX) 321 multiplexes the STS-M into an electrical OC-N and, then, electrical/optical (E/O) interface 322 supplies the optical OC-N signal to transmission path 108.

The controller 102 operates to effect the deterministic squelching of communications circuits, in accordance with the principles of the invention. Controller 102 communicates with receivers 301 and 314 and transmitters 311 and 320 via 323 and with interface 324 via bus 327. Specifically, in this illustrative example, controller 102 monitors the incoming digital signals to determine loss-of-signal, SONET format K bytes and the like. Additionally, controller 102 causes the insertion of appropriate K byte messages for protection switching purposes, examples of which are described below. To realize the desired deterministic squelching of the communications circuits, controller 102 may be advantageously provisioned via bus 328 with the identities ("IDs") of all the active communications circuits in the ring node. These include those communications circuits passing through the ring node, as well as, those communications circuits being added and/or dropped at the ring node. The identities of all the ring nodes in bidirectional line-switched ring 200 may also be provided to controller 102 and stored in storage 104. In-band signaling may also be used to supply ring nodes 201 through 204 with the identifies of all the ring nodes in bidirectional line-switched ring 200 and the identities of communications circuits active in the ring node. In this scheme, control signals are embedded in the data stream itself. Alternatively, such identification could also be made using a central controller at some remote location to the ring, and the results forwarded to each ring node 201 through 204. The squelching of communications circuits under control of controller 102 to effect the invention is described below.

The interface 324 is employed to interface to a particular duplex link 325 and could include any desired arrangement. For example, the interface 324 could include a DS3 digital signal interface to a DSX, a STS-1E (electrical) SONET digital signal interfacing to a DSX, an optical extension interface to an OC-N SONET optical signal or the like. Such interface arrangements are known. Specifically, a signal (R) to be dropped at the ring node is supplied to the interface 324 via 2:1 selector 308, under control of controller 102, from either broadcast element 306 or broadcast element 318. In turn, the interface 324 supplies the appropriate signal to duplex link 325. A signal (T) to be added at the ring node is supplied from duplex ling 325 to interface 324 where it is converted to the STS-M digital signal format, if necessary. The STS-M digital signal is then supplied to broadcast element 326 where it is replicated. The replicated STS-M digital signals are supplied by broadcast element 326 to an input of 3:1 selector 307 and an input of 3:1 selector 309. In this example, 3:1 selectors 307 and 309, under control of controller 102, select the signal being added for transmission in the service bandwidth or the protection bandwidth on either transmission path 210 or transmission path 220 (respectively corresponding to paths 106 and 110 and paths 108 and 112 within the node).

It should be noted that, in this example, the normal transmission path for a digital signal being added at the ring node 100, would be in the service bandwidth on transmission path 110 toward the East (E) and transmission path 108 towards the west (W), for example. If there were to be a protection switch, the signal (T) being added from interface 324 would be bridged via broadcast element 326 and chosen by 3:1 selector 307, under control of controller 102, to the protection bandwidth on transmission path 110. Similarly, if there were to be a loop-back protection switch and the ring node was adjacent to the failure, the signal (R) to be dropped at the ring node would be received in the protection bandwidth on transmission path 112 and would be switched from broadcast element 318 via 2:1 selector 308 to interface 324. It is noted that "failure" or "ring node failure" as used herein is intended to include node equipment failure and "node isolation failure" caused by optical fiber cuts, cable cuts or the like. A node isolation failure is a failure where a group of one or more ring nodes appear to be failed since they are unreachable by other ring nodes in the ring transmission system because of other failed ring nodes or by fiber and/or cable cuts. If the transmission path for the signal (R) is the protection bandwidth, the signal (R) to be dropped would be switched in a ring node adjacent the failure from the protection bandwidth on transmission path 112 to the service bandwidth on transmission path 110 and received at the ring node in the usual fashion. Then, the signal (R) being dropped from transmission path 110 is supplied via broadcast element 306 and 2:1 selector 308 to interface 324.

As indicated above, controller 102 monitors the status of interface 324 and the digital signal supplied thereto via bus 327. Specifically, controller 102 monitors interface 324 for loss-of-signal, coding violations and the like, i.e., a signal failure condition. Under control of controller 102, digital signals may be passed through, added at, dropped at, bridged at or loop-back-switched at the ring node 100. A loop-back-switch of an STS-M digital signal incoming in the service bandwidth on transmission path 106 is effected by controller 102 causing 3:1 selector 309 to select the STS-M digital signal from broadcast element 306 and supplying it via squelcher (S) 319 to transmitter 320. In turn, transmitter 320 supplies an OC-N optical signal to the protection bandwidth on transmission path 108. It will be apparent that in the loop-back-switch operation, if the signal is incoming in a service bandwidth on transmission path 106, it will be loop-back-switched to the protection bandwidth on transmission path 108 and vice versa. If the signal is incoming in protection bandwidth on transmission path 112, it will be loop-back-switched to the service bandwidth on transmission path 110 and vice versa. A signal to be added at the ring node is supplied from interface 324, replicated via broadcast element 326 and selected either by 3:1 selector 307 or 3:1 selector 309, under control of controller 102, to be added on transmission path 110 or transmission path 108, respectively. A digital signal to be dropped at the ring node is selected by 2:1 selector 308, under control of controller 102, either from broadcast element 306 (transmission path 210, that is, 106/110) or broadcast element 318 (transmission path 120, that is, 108/112). The pass-through and loop-back-switch functions for a signal incoming on transmission path 120 (112/108) is identical to that for an incoming signal on transmission path 110 (106/110).

Possible communications circuit loops are avoided in the bidirectional line-switched ring 200, in accordance with the invention, by blocking communications circuits active in a particular ring node using a generalized deterministic squelching method, which is described in detail below. To this end, each ring node in bidirectional line-switched ring transmission system 200 is typically equipped to effect the desired blocking via squelchers (s) 304, 310, 317 and 319, under control of controller 102. In this example, both incoming and outgoing communications circuits are squelched, however, it may only be necessary to squelch outgoing communications circuits.

FIG. 4 shows, in simplified block diagram form, details of an exemplary squelcher (S) unit 304. Specifically, the STS-M digital signal is supplied to demultiplexer (DEMUX) 401 where it is demultiplexed into its constituent MSTS-1 digital signals 402-1 through 402-M. The M STS-1 digital signals are supplied on a one-to-one basis to AIS insert units 403-1 through 403-M. AIS insert units 403-1 through 403-M, under control of controller 102, insert the AIS in the STS-1 digital signals included in the communications circuits, i.e., STS-M digital signals, to be blocked. Details of AIS insert units 403 are shown in FIG. 4 and described below. Thereafter, the M STS-1 digital signals are multiplexed in multiplexer (MUX) 404 to yield the desired STS-M digital signal. The details of multiplex schemes for the STS-M digital signal are described in the technical advisory TA-NWT-000253, noted above.

FIG. 5 shows, in simplified block diagram form, details of AIS insert units 403. Specifically, shown is a STS-1 digital signal being supplied to AIS generator 501 and to one input of 2:1 selector 502. AIS generator 501 operates to insert AIS in the STS-1 digital signal. As indicated in the technical advisory TA-NWT-000253, the STS path AIS is an all ones (1's) signal in the STS-1 overhead bytes H1, H2 and H3 and the byes of the entire STS SPE (synchronous payload envelope). Selector 502 selects as an output, under control of controller 102, either the incoming STS-1 digital signal or the STS-1 digital signal with AIS inserted from AIS generator 501.

Deterministic squelching is provided, in accordance with the invention, by a method whereby, despite ring node failures, a communications circuit is delivered to as many drops as possible so long as both the relative first source node and relative last source node providing communications transmissions to a node have not failed. A generalized squelching method for basic unidirectional circuits requires only one rule in accordance with the principles of the invention. It is assumed that the particular ring node of interest (i.e., that ring node used as the loopback switching ring node to heal the ring), is adjacent to a failed ring node. Assume, with respect to the switching ring node, that one or more failed ring nodes are in the direction of a unidirectional communications circuit (i.e., the failed ring nodes including the failed adjacent ring node are downstream from the switching ring node); squelch the communications circuit, in the direction of the communications circuit, if and only if the ring node failure scenario includes the relative last source ring node for the communications circuit and there is a failure in the opposite direction from the direction of the unidirectional communications circuit, including the relative first source node.

Those skilled in the art will appreciate that the above rule may be applied to unidirectional circuits having multiple sources and one or more drops. Accordingly, communications circuits falling under this rule include, for example, unidirectional communications circuits having a multiple sources and a single drop, and communications circuits having various combinations of multiple sources, one or more drops, and/or multiple broadcasts.

Figure 6:
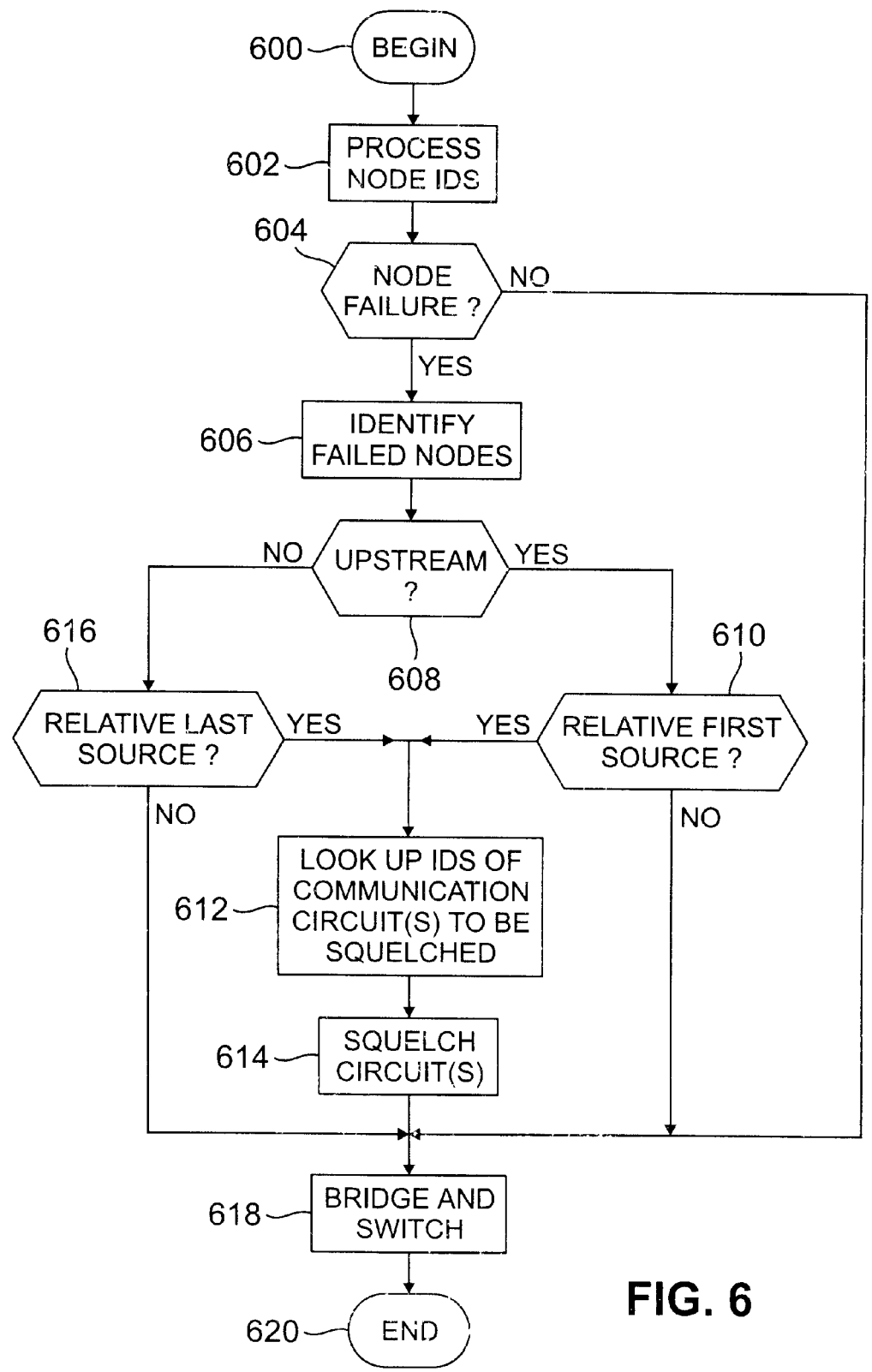
FIG. 6 is a flow chart which illustrates the operation of a controller within the new node.

FIG. 6 is a flow chart illustrating the operation of controller 102 in controlling the ring nodes in order to effect the blocking of communications circuits in the presence of ring node failures in accordance with the rule discussed above. It is assumed that the node associated with the controller 102 is a switching node. The process begins in step 600 and proceeds to step 602 where the controller 102 examines the K bytes of an incoming OC-N signal, and processes the ring node IDs therein. Then, in step 604 the controller 102 tests to determine if the processed ring node IDs indicate that one or more ring nodes have failed. Again, a ring node failure is defined as to include ring node equipment failure and node isolation failure caused by fiber cuts and the like. Specific examples of failure conditions are discussed below. If no ring nodes have failed, the process proceeds to step 618 where the usual bidirectional ring bridging and switching are effected, as appropriate. From step 618 the process proceeds to end in step 620.

If, on the other hand, the controller 102 determines in step 604 that a node has failed, the process proceeds from step 604 to step 606. In step 606 the controller identifies the failed ring nodes. From step 606 the process proceeds to step 608, where the controller determines whether the failed ring node, which is adjacent to the ring node associated with the controller, is an upstream ring node, that is, whether it is located in the opposite direction from the direction of data flow. If the failed node is an upstream node, the process proceeds to step 610 where it is determined whether the failed node is a relative first source node (the A entry in the squelch table). If the failed node is not a relative first source node for a circuit passing through this, the switching, node, the process proceeds to step 618, and from there as previously described. Otherwise, the process proceeds to step 612 where the controller looks up the identifications of communications circuits to be squelched. After identifying the circuits to be squelched, the process proceeds to step 614 where the identified circuits are squelched, or, more generally, blocked. From step 614 the process proceeds to step 618, and from there as previously described. If, in step 608, it is determined that the failed node is not an upstream node, the process proceeds to step 616, where it is determined whether the failed node is a relative last source (the A entry in the squelch table). If the failed node is a relative last source node, the process proceeds from step 616 to step 612, and from there as previously described. If, in step 616, it is determined that the failed node is not a relative last source, the process proceeds to step 618, and from there as previously described. It should be noted that squelching takes place only if both the relative first and relative last source nodes have failed.

The steps of identifying failed ring nodes and identifying affected active communications circuits may be performed, for example, by using a ring "map," or look-up tables, which are stored in each ring node in the system, in combination with line-switch request messages generated by the ring nodes. The ring maps could include, for example, information regarding the order in which ring nodes appear on the ring and ring node addresses at which each communications circuit enters and exits the ring. As discussed above, a given communications circuit has multiple sources and may have multiple drops. Consequently, a circuit will have multiple source node addresses. STS time slot information may also be included in the maps where appropriate.

One example of a way in which the controller 102 may employ ring maps and line switch request messages to identify failed ring nodes follows. Suppose a segment of a ring consisting of three ring nodes A, B, and C is observed, where B has failed. In a typical scenario, both A and C will send line-switch request messages in the APS channel K1 byte destined for B. When A sees the request from C, fails to receive a signal from B (i.e., A detects a loss-of-signal), and sees that B is between A and C (using the ring map), it can determine that B is isolated from the ring. A and C will then use their respective ring maps, and apply the method just described, to determine which communications circuits are affected by the failure of B, and squelch those affected circuits by inserting AIS, as described above, to thereby avoid circuit loops. Those skilled in the art will appreciate that the described signaling is readily applicable to the present invention as an example of how the identification step in operational step 606 of FIG. 6 may be performed.

FIGS. 7 through 10 illustrate examples of the operation of a multi-source broadcast ring node communications system 700 in accordance with the principles of he present invention. In the block diagram of FIG. 7 nodes A and Z are source nodes and nodes E,F,G,L,M, and N are all drop and continue nodes. Each of the nodes is a node such as node 100 previously described, configured by the controller 102 to drop-and continue, or to operate as source nodes. Each source node A, Z is connected to a signal source. In this illustrated embodiment the signal sources are identical video headends 702. The illustrative video headends provide video signals for broadcast on the ring 700 and acquires the signals, for example, from one or more satellite antennas 704 and/or a local video unit 706. The local video unit 706 could be a storage unit or a video feed from another source and could be employed to provide near video on demand (NVOD) service to the system 700, for example. An interface unit 708 formats the video signals appropriately for the system, using a SONET format for example, and feeds the formatted signals to an input of its associated source node, A or Z.

Figure 7:
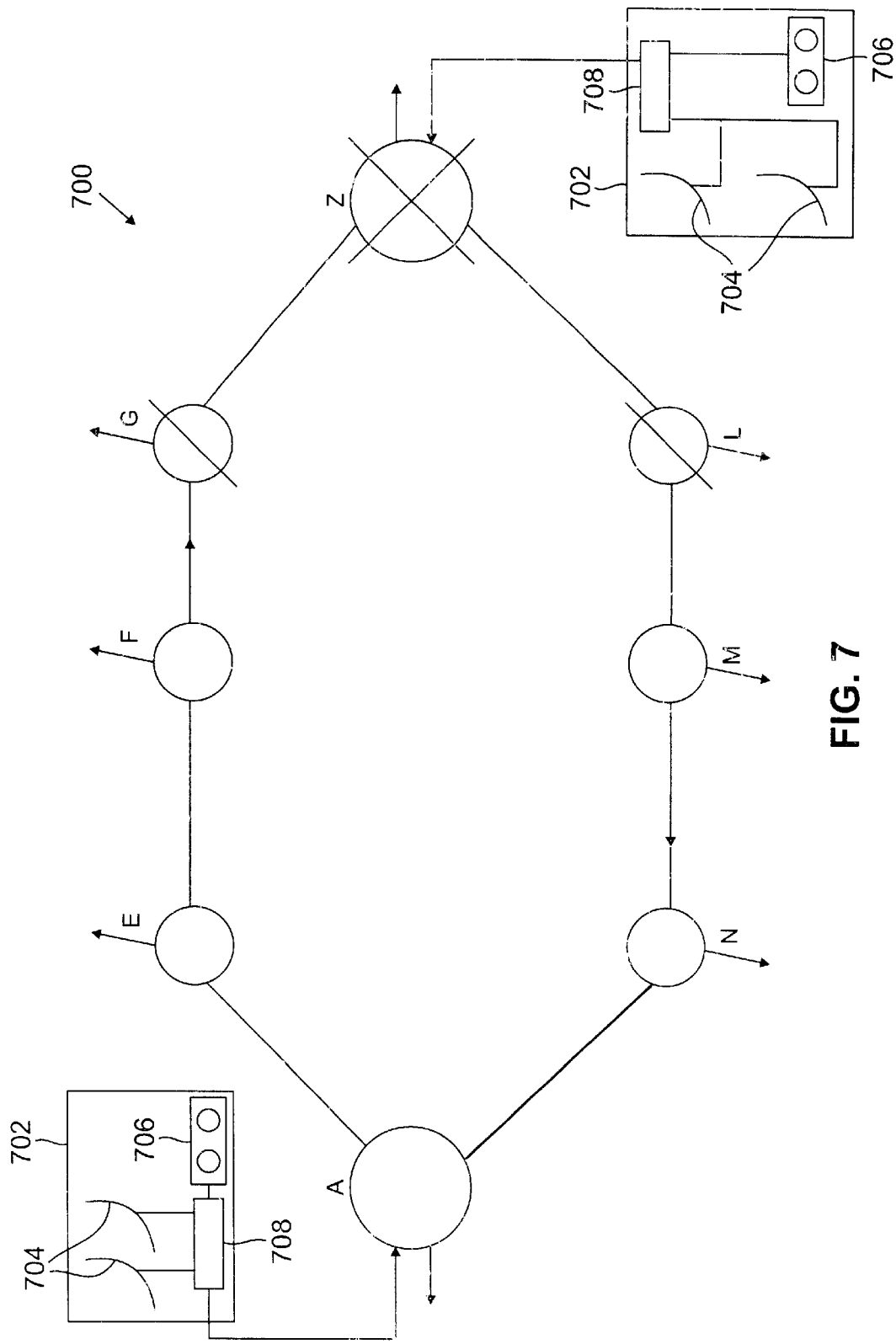
FIGS. 7 through 10 are conceptual block diagrams of a broadcast ring transmission system in accordance with the principles of the present invention, with various node failures, and the node responses to those failures depicted.

In the example of FIG. 7, source node Z has failed, as indicated by the X drawn through the node. Nodes G and L, being adjacent to node Z, are switching nodes and, according to the principles of the invention, particularly as set forth in the method described in relation to the discussion of FIG. 6, nodes G and L determine that, although their relative first and last source nodes, respectively, has failed, their respective last and first source nodes have not. Consequently, neither node G or L blocks by squelching, both nodes perform a loopback, and signals are broadcast from source node A through nodes E, F, and G. At each of these nodes the signals are dropped and, because G performs a loopback, the signals return along the protection channel from node G through nodes F, E, A, N, M, and L. Node L's loopback sends the signals back through nodes M, and N, to node A, where it is dropped. In this way, despite the loss of the source node Z, which loss could be due to a loss of signal from node Z's associated video headend, all nodes within the network except node Z receive a broadcast video signal. Observe that, despite the fact that a circuit is added and dropped at node Z which has failed, in this illustrative broadcast application, no squelching is done on the ring.

Figure 8:
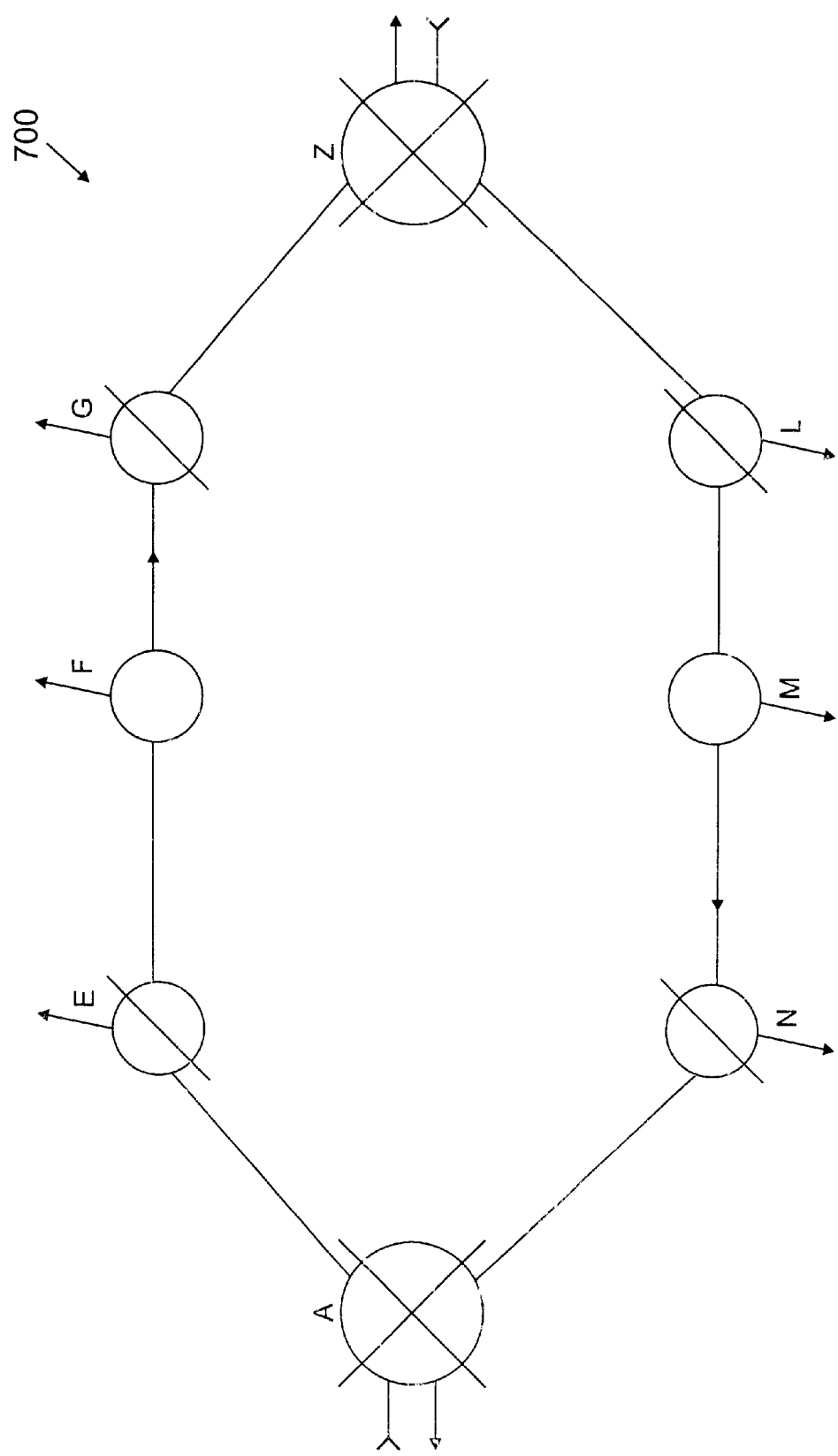

The conceptual block diagram of FIG. 8 illustrates the same circuit as FIG. 7, with the video headends 702 eliminated for clarity. In this illustrative example the two source nodes, A and Z, have failed. Consequently, each of the switching nodes, E, G, N, and L block signal transmissions, thereby preventing the creation of an "infinite loop" within the system whereby pointers are mishandled and the ultimate recovery of the system 700 may be significantly delayed.

Figure 9:
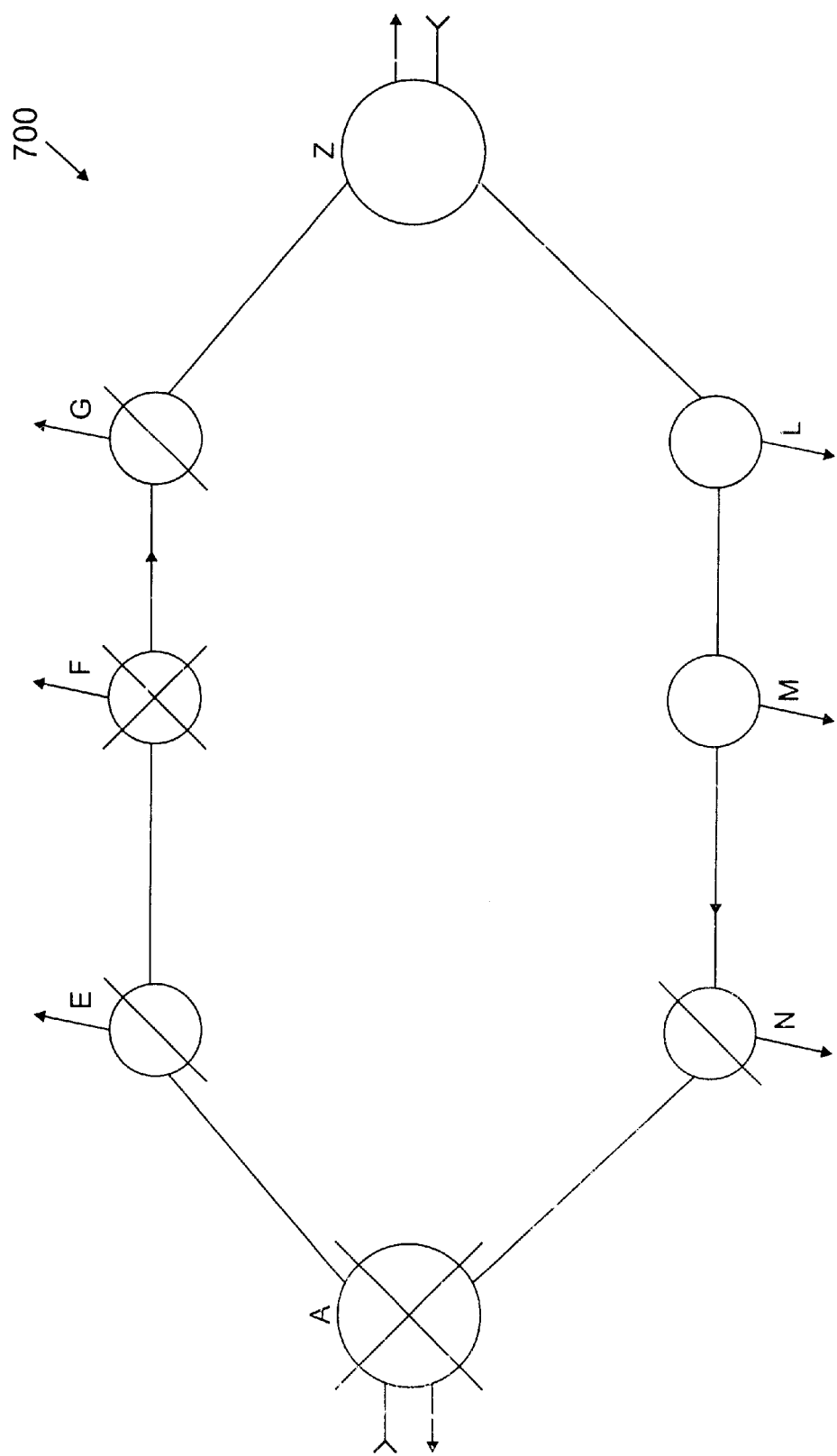

In the failure scenario depicted by the conceptual block diagram of FIG. 9, the source node A and drop and continue node F have failed. Nodes E, N, and G are, therefore switching nodes and all three nodes perform a loopback. Since node E is completely isolated by the upstream failure of node A and the downstream failure of node F, its relative first source node and its relative last source node have failed, and it will squelch. Signals provided through the source node Z will be transmitted through nodes L, M, and N and returned along the protection channel from node N through nodes M, L, and Z, to node G. From node G the signals will be returned through a protection loopback to be dropped at node Z.

Figure 10:
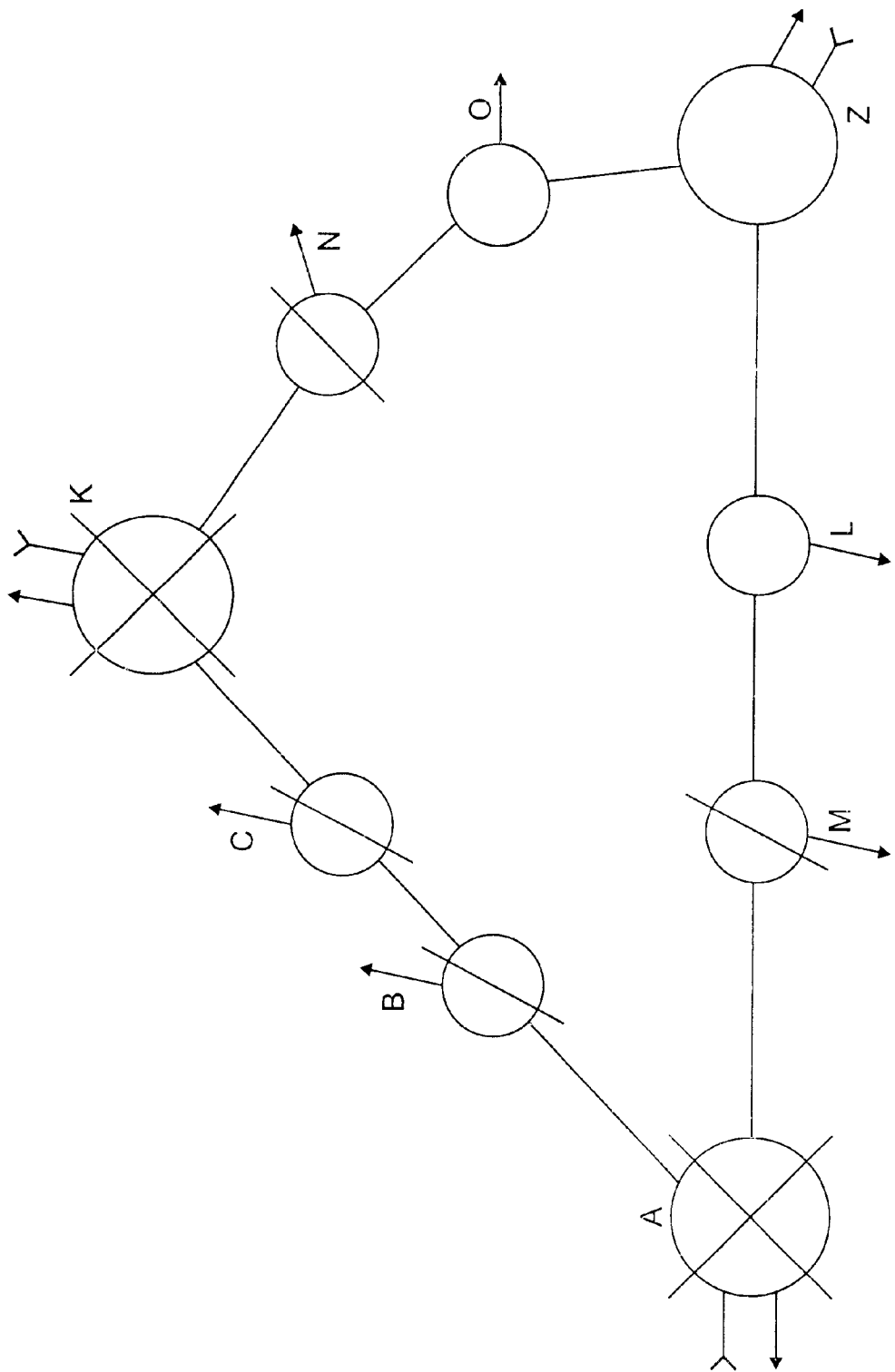

The conceptual block diagram of FIG. 10 illustrates the operation of a system that includes three source nodes: nodes A, K, and Z. Again, the ultimate sources of the signals that are transmitted through the system, video headends for example, are eliminated from the figure for clarity. Signals acquired at the source node A are normally transmitted to nodes B, and C which are configured as drop and continue nodes, and, from node C, to node K, where the signals are dropped for local use. Similarly, signals acquired at source node K are transmitted to drop and continue nodes N and O, and on to node Z where they are dropped for local use. Signals acquired at the source node Z are transmitted to drop and continue nodes L and M, and from node M to node A, where they are dropped for local use. In the illustrative example of FIG. 10, the source nodes A and K have failed and drop and continue nodes B, C, M and N are switching nodes. The relative first source node for both nodes B and C is node K and the relative last source node for both nodes B and C is node A. Consequently, since both nodes A and K have failed, both nodes B and C are "source-isolated" and will block communications transmissions, by squelching, for example, as previously described. Nodes M and N will perform loopbacks thereby allowing all nodes except nodes A, B, C, and K to continue delivering signals. In this case the signals are supplied by the surviving source node Z.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A ring node for use in a broadcast ring transmission system that includes a plurality of broadcast source nodes, including a relative first source node and a relative last source node, said ring node comprising:

a controller for monitoring signals into the ring node to determine whether an adjacent node has failed, wherein the controller blocks a communication circuit passing through the ring node if the failed adjacent node is upstream from the ring node and the relative first broadcast source node has failed, or the failed adjacent node is downstream from the ring node and the relative last broadcast source node has failed.

2. A ring node for use in a broadcast ring transmission system that includes a plurality of broadcast source nodes including a relative first source node and a relative last source node, said ring node comprising:

a controller for monitoring signals into the ring node to determine whether said first and last broadcast source nodes have failed, wherein the controller blocks a communication circuit passing through the ring node in response to an indication that the relative first and last broadcast source nodes have failed.

3. A broadcast ring transmission system comprising:

a drop and continue node;

a first source node that is a relative first source node to the drop and continue node; and a second source node that is a relative last source node to the drop and continue node, the first and second source nodes being broadcast source nodes;

wherein the drop and continue node comprises a controller for blocking a communication circuit passing through the drop and continue node in response to an indication that the relative first and last broadcast source nodes have failed.

4. The ring system of claim 3 wherein the controller blocks the communication circuit by squelching.

5. The ring system of claim 4 wherein the controller squelches by sending alarm indication signals (AIS).

6. A broadcast ring transmission system comprising:

a drop and continue node; and a plurality of broadcast source nodes including a source node that is a relative first source node to the drop and continue node and a source node that is a relative last source node to the drop and continue node;

wherein the drop and continue node comprises a controller for blocking a communication circuit passing through the drop and continue node in response to an indication that the relative first and last broadcast source nodes have failed.

7. The broadcast ring transmission system of claim 6 wherein the drop and continue node further comprises:

a squelch table containing indicators of the relative first and last broadcast source nodes in the broadcast transmission system as the ring squelch points;

wherein the controller is responsive to failures in both ring squelch points by blocking the communication circuit.

8. The broadcast ring transmission system of claim 3 further comprising at least one additional broadcast source node.

9. The broadcast ring transmission system of claim 8 wherein the ring transmission system is a bidirectional line switched ring.

10. The broadcast ring transmission system of claim 9 wherein each of the plurality of broadcast sources comprises a cable television headend.

11. The broadcast ring transmission system of claim 10 wherein at least one of the plurality of broadcast sources is also a drop and continue node.

12. A broadcast ring transmission system comprising:

a drop and continue node;

a plurality of broadcast source nodes including a source node that is a relative first source node to the drop and continue node and a source node that is a relative last source node to the drop and continue node;

wherein the drop and continue node comprises means for blocking a communication circuit passing through the drop and continue node in response to an indication that the relative first and last broadcast source nodes have failed.

13. A method within a ring node of preventing infinite loops within an associated broadcast transmission system that includes a plurality of broadcast source nodes, including relative first and last source nodes, comprising the steps of:

determining whether the relative first and last broadcast source nodes have failed; and blocking a communication circuit passing through the ring node in response to an indication that the relative first and last broadcast source nodes have failed.

14. The method of preventing infinite loops of claim 13 wherein the step of determining whether the relative first and last broadcast source nodes have failed includes the step of storing the identification of the relative first and last broadcast source nodes within the ring node.

15. The method of claim 14 wherein the identification of the relative first and last broadcast source nodes includes storing the identification of the first and last broadcast source nodes within a squelch table within the ring node.

16. The method of claim 15 wherein the step of blocking a communication circuit comprises the step of transmitting alarm indication signals (AIS).

17. A method of distributing signals comprising the steps of:

broadcasting signals around a ring transmission system from first and second broadcast sources to at least one drop and continue node; and blocking a communication circuit passing through the at least one drop and continue node in response to an indication that the first and second broadcast sources have failed.

18. The method of claim 17 wherein the signals are television signals and the first and second broadcast sources are television headend sources.

19. A method of distributing television signals comprising the steps of:

broadcasting television signals from a first television headend source node to a first drop and continue node in one direction in a ring transmission system;

broadcasting television signals from a second television headend source node to a second drop and continue node in the ring transmission system in the same direction around the ring transmission system as that in which the first television headend signals are broadcast, the two headend source nodes closest to a drop and continue node forming its relative first and last broadcast source nodes; and blocking a communication circuit passing through at least one of the first and second drop and continue nodes in response to an indication the first and last broadcast source nodes thereof have failed.

20. A ring node for use in a broadcast ring transmission system that includes a plurality of broadcast source nodes, said ring node comprising:

a controller for blocking a communication circuit passing through the ring node in response to an indication that the ring node is broadcast source-isolated.

21. The ring node of claim 20 wherein the ring node is a bidirectional line switched ring node.

22. The ring node of claim 20 wherein the controller the communication circuit by squelching.

23. The ring node of claim 20 wherein the controller squelches by sending alarm indication signals (AIS).

24. The ring node of claim 21 wherein the controller is further responsive to an indication that first and last broadcast source nodes relative to the ring node have failed.

* * * * *